United States Patent [19]

Laskaris et al.

[11] Patent Number: 4,495,231
[45] Date of Patent: Jan. 22, 1985

[54] FIBER COMPOSITE

[75] Inventors: A. Theodore Laskaris, Danvers; Paul J. Roy, Lowell, both of Mass.

[73] Assignee: Avco Corporation, Wilmington, Mass.

[21] Appl. No.: 427,085

[22] Filed: Sep. 29, 1982

[51] Int. Cl.³ .............................. B32B 3/10; B32B 5/12; B32B 9/00
[52] U.S. Cl. ............................ 428/36; 156/169; 156/172; 156/180; 428/35; 428/105; 428/107; 428/113; 428/137; 428/139; 428/366; 428/375; 428/376; 428/377
[58] Field of Search .............. 428/31, 107, 109, 110, 428/111, 105, 113, 137, 139, 366, 367, 368, 375, 376, 377, 408, 35, 58; 156/180, 161, 172

[56] References Cited
U.S. PATENT DOCUMENTS

| | | | |
|---|---|---|---|
| 3,490,983 | 1/1970 | Lee | 428/377 |
| 3,700,535 | 10/1972 | McCoy et al. | 428/367 |
| 4,039,006 | 8/1977 | Inoue et al. | 428/377 X |
| 4,135,035 | 1/1979 | Branen et al. | 428/366 X |
| 4,172,175 | 10/1979 | Pearson et al. | 428/377 X |
| 4,257,835 | 3/1981 | Bompard | 428/367 |

Primary Examiner—Lorraine T. Kendell
Attorney, Agent, or Firm—Abraham Ogman

[57] ABSTRACT

An improved fiber composite including a first layer (18) having a plurality of elongate flexible fabric segments (16) for laying up on and conforming to an elongate irregularly shaped temporary support (10) to substantially cover support (10) and a plurality of continuous yarns (b 17) extending substantially the length of support (10). A second layer (26) includes a continuous yarn (20) wound peripherally upon the first layer (18) and oriented substantially orthogonally with the longitudinal yarns (17) of first layer (18). A method for manufacturing the fiber composite is also provided.

7 Claims, 12 Drawing Figures

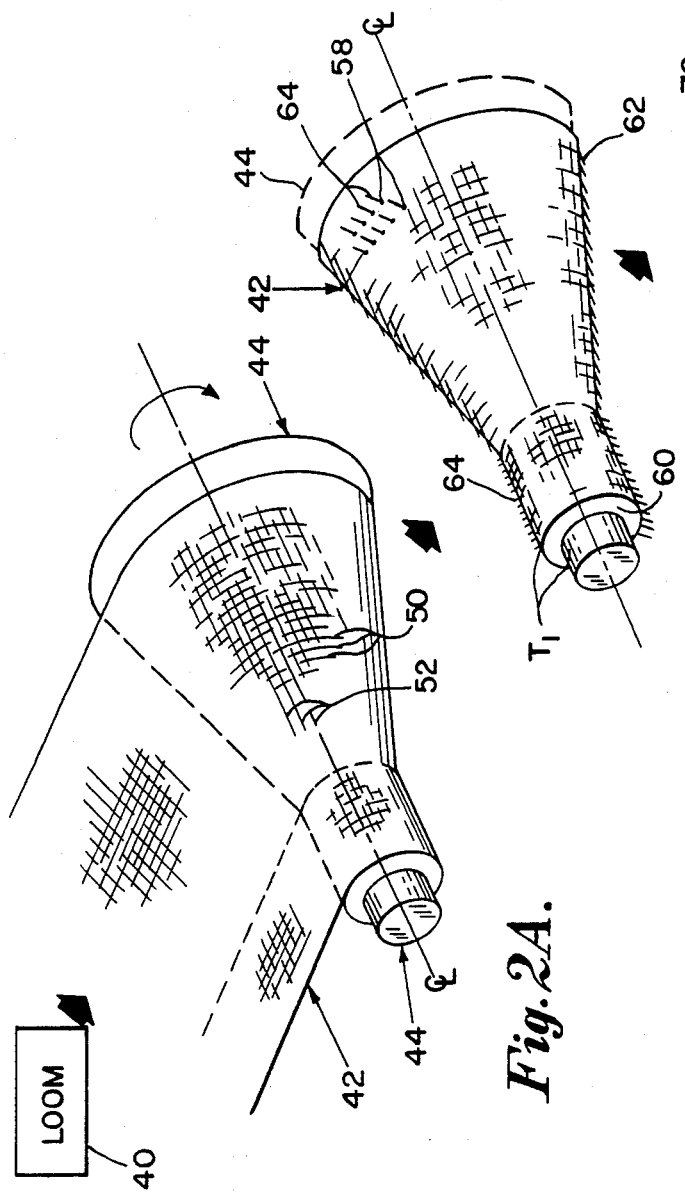
Fig.2A.
Fig.2B.
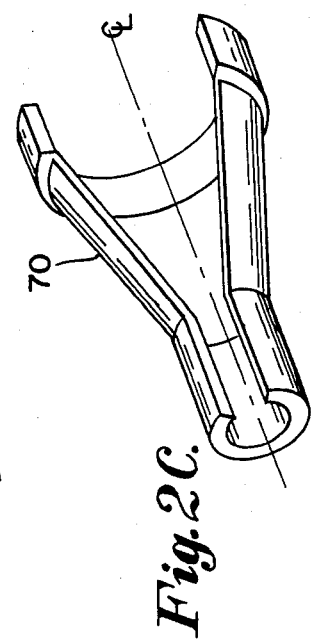
Fig.2C.

FIBER COMPOSITE

BACKGROUND OF THE INVENTION

The invention relates to fiber composite structures of elongate irregularly shaped shell body form and to a method for manufacturing such a composite.

Shell bodies having configurations based on barrel-shaped cylinders, frustum of right circular cones, ball (spherical) ellipsoid and parabolic shaped cones, venturi-shaped tubes and combinations thereof with right circular cylinders are extensively utilized as exhaust rocket nozzle and exit cone components. Such shell bodies typically comprise a fiber reinforced composite construction. However, present fiber composites do not display optimum structural properties when put to such use. Rather, present composites exhibit difficulty in withstanding the demanding thermostructural requirements placed upon them. Often, conventional constructions exhibit anisotropic properties, with one direction undesirably weaker than the other.

One present method of providing fabric composites is the involute fabric lay-up technique wherein several bunched plies of fabric previously impregnated with phenolic resin, e.g. prepregged fabric, are laid up on the other support. Each fabric ply typically extends from end to end and the resulting lay-up of fabric plies around the periphery of the support resembles a deck of fanned out playing cards. Following completion of the lay-up considerable debulking of the plies is required to condense the bulk of the layers prior to final molding and curing. During such debulking the fabric plies tend to wrinkle and be distorted. Such defects may cause delamination of the fabric plies in the resulting molded resin composite, subsequent densification processing of the resin base composite into carbon-carbon composite form or failure during propulsion motor test firing. Further, the orientation of the fiber in the fabric plies is such that the construction is inherently weak in the peripheral direction. Warp fibers, which are arranged in an off axis pattern are noncontinuous. Because the fabric plies are distinct the crossing fibers are likewise noncontinuous. Such noncontinuity results in composite weakness in both the longitudinal and peripheral directions.

Several alternative material methods of construction and fabrication approaches including filament winding, braiding, knitting, woven socks and 2D/3D construction have been utilized. However each of these new concepts have inherent deficiencies in their constructions in terms of providing resistance to in-process delamination and an optimum balance of material properties needed for in-use application. Some of the inherent drawbacks of these concepts include; limitation in achieving high fiber content, lack of cross-ply reinforcement to prevent in-process delamination of plies and lack of a mechanism for venting (out-gassing) of volatiles generated between plies during densification process.

It is therefore an object of this invention to provide a fabric composite which exhibits enhanced isotropic structural strength.

It is a further object of this invention to provide such a composite which is suitable for use in complex irregular shaped applications such as for rocket motor components, e.g. rocket exhaust nozzles and exit cones.

A further object of this invention is to provide constructions capable of sustaining fabrication (lay-up and/or molding) processing, resin impregnation and subsequent carbonization and graphitization processing and motor firing survivability without inducing wrinkles, fiber distortion and/or delamination.

A further object of this invention is to provide constructions having flexibility in altering the architecture of reinforcement to meet specific thermostructural design requirements.

It is a further object of this invention to provide a method for constructing the aforesaid composite manufacture.

SUMMARY OF THE INVENTION

This invention results from a realization that to provide highly desirable circumferential (peripheral), axial and off-axis strength properties and isotropic characteristics the fibers of fabric covering a shell body should be oriented substantially orthogonal to each other and conform to the shape of the body. As used in this invention description, the term "substantially orthogonally" indicates an orientation which may vary by a factor of $+/-$ 45 degrees from precisely orthogonal, e.g. from 45 degrees to 135 degrees orientation.

Therefore this invention features a fabric composite and a method for making such a composite. A plurality of elongate fabric segments, each including a plurality of continuous yarns are laid up on an elongate, irregularly shaped temporary support, such as a mandrel. The yarns are made to extend substantially the length of the support so that the support is covered by the fabric segments in a first layer. A second layer substantially covers the first layer and includes a continuous yarn wound peripherally about the first layer in such a manner that the continuous yarn is oriented substantially orthogonally with the longitudinal yarns of the first layer fabric.

A thicker composite may be provided wherein additional alternating layers of fabric segments and wound yarn are applied over the first and second layers.

The yarns used by this invention typically include multiple filament yarns although monofilaments may be utilized. Continuous yarn as used herein should be understood to include both continuous filament and staple filament yarn. Such yarns may be composed of carbon (for use in carbon-carbon composites, e.g. carbon fabric embedded in a carbon matrix) graphite, glass, quartz or other suitable materials.

Typically the composite is impregnated in a resin matrix. Various resins such as thermoplastic or thermoset, e.g. for use in carbon-carbon applications, may be employed. In certain embodiments, particularly those involving carbon-carbon composites, a number of cooperating perforations are made in the composite layers. Each such perforation is made typically at a similar sharp angle through the layers to insure uniform and optimal distribution of the resin therethrough. A rod element, preferably comprising a piece of carbon or graphite yarn (in a matrix) similar to that employed in the layers is longitudinally inserted into each of the perforations to maintain the perforation in an open condition so that the epoxy resin may be effectively passed therethrough. The impregnated fiber composite may then be heated through pyrolysis so that volatiles are driven off from the resin matrix and the resin is progressively carbonized and graphitized to provide a carbon-carbon composite. The perforations assist in venting volatile gases from the underlying layers. The temporary support may be removed at any point after which the composite is self supporting.

An alternative fiber composite and method of making the same is also provided. A fabric is woven such as on a conventional loom in a shape conforming to an elongate irregularly shaped temporary support and is wound continuously and peripherally thereabout to substantially cover the support. The fabric includes a plurality of continuous warp and fill yarns composed typically of yarn of the type heretofore described. The fill yarns extend substantially the length of the support and the warp yarns are oriented substantially orthogonally with the fill yarns for winding peripherally about the support.

This embodiment is likewise particularly suited for use in carbon-carbon applications. A number of perforations may be made through the fabric and a number of rod elements, each again including a piece of relatively hard carbon or graphite fiber may be inserted in the perforations for holding such passageways open.

Preferably one or more application of a suitable resin, heretofore described, may be made to impregnate the fabric in a resin matrix. Heating at proper levels serves to carbonize and graphitize the resin matrix. The series of perforations serves to facilitate resin impregnation of the underlying layers and escape of volatiles such as hydrogen and oxygen during heating. The temporary support may be removed when the composite becomes self-supporting.

Other objects, features and advantages of the invention will be apparent from the following detailed description of preferred embodiments with reference therein to the accompanying drawing in which:

BRIEF DESCRIPTION OF THE DRAWING

FIGS. 2A-C are isometric views showing a method of manufacturing an alternative fabric composite according to this invention;

DETAILED DESCRIPTION OF PREFERRED EMBODIMENTS

There is shown in FIGS. 1A-D a preferred method of manufacturing a fabric composite according to this invention. The composite is formed on a temporary support 10 which includes a right cylinder portion 12 and a cone portion 14.

Figure 1A:
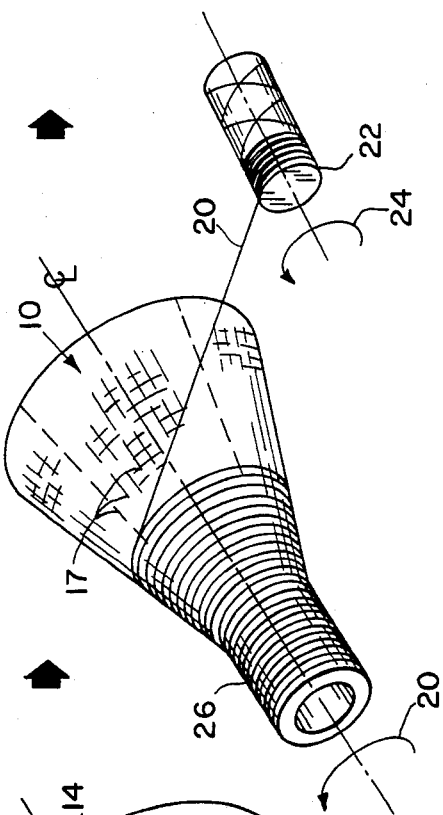
FIGS. 1A-D are isometric views showing a method of manufacturing a fabric composite according to this invention.

As shown in FIG. 1A, four 90 degree fabric segments 16 (only two of which are shown for clarity) are laid up on support 10. Each segment 16 has a shape conforming to support 10. The segments 16 are dry unlike the stiff prepregged fabric segments utilized in the involute method. A plurality of yarns 17, (warp or fill) typically comprising carbon or graphite yarn extend axially the length of each fabric segment 16.

Figure 1B:
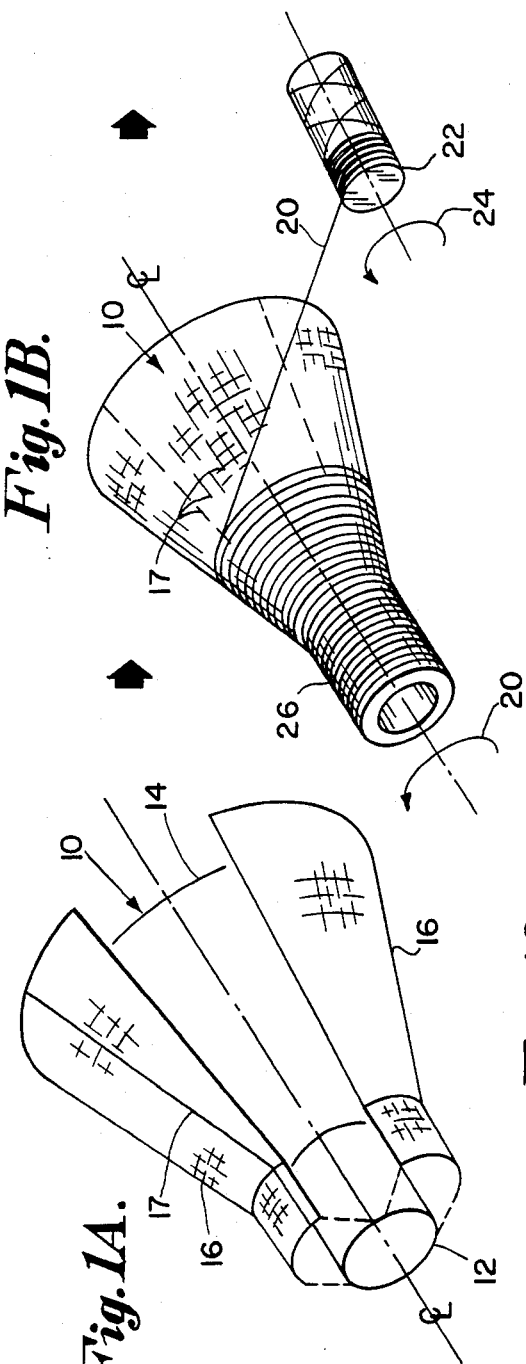

Segments 16 thus form a fabric layer 18 which is overwound with a continuous carbon or graphite yarn 20, FIG. 1B. Such winding is accomplished as follows: Support 10 is rotatably mounted about center line axis $C_L$. The manner of mounting is conventional in the art and not shown. Supply 22 of yarn 20 is similarly mounted. Support 10 and supply 22 are rotated in the direction of arrows 24 so that yarn 20 is drawn onto support 10 and wound peripherally thereabout to form a second layer 26. Yarn 20 is oriented orthogonally with 17. Support 10 is thus covered by continuous longitudinal and peripheral yarns 17 and 20, respectively. Optimum peripheral and longitudinal strength of layers 18, 26 is thereby achieved Alternating layers of fabric segment and peripheral (circumferential) yarns are then applied until a desired thickness is achieved, FIG. 1C.

Figure 1C:
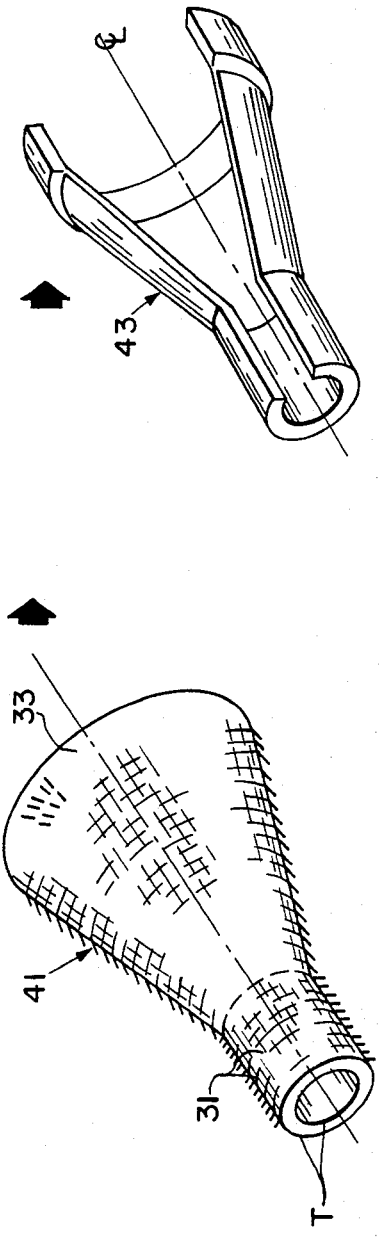
Figure 3:
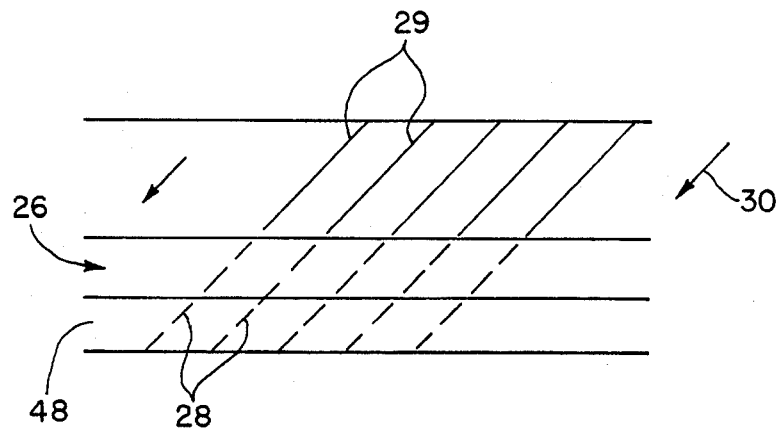
FIG. 3 is a simplified cross-sectional view of a method of perforating the fiber layers of this invention.

The fiber layers are provided with a number of cooperating perforations 28 disposed therethrough. Only a small area having perforations is shown in FIG. 1C. Actually such perforations may be provided all over the structure. A manner of piercing the covering to provide perforations 28 is shown in FIG. 3. A series of sharp needles 29 are simultaneously driven in the direction of arrow 30 to pierce the layers 18, 26 of fabric segments and wound yarn, respectively. Alternatively, such perforations 28 may be made one at a time or otherwise sequentially by driving only a single needle or a small number of needles through the layers. Perforations 28 are similarly angled through the fiber layers (e.g. relative to the plane thereof). When additional alternating layers are applied as in FIG. 1C cooperating perforations are made through each of the additional layers. Thus right cylinder section 31 FIG. 1C, is pierced at 45 degrees to $C_L$. Cone portion 33, itself extending at 45 degrees from $C_L$, is pierced at 0 degrees to $C_L$. Perforations 28 are further oriented to pass an optimal distance through each layer thereby providing advantages explained hereinafter.

Figure 4:
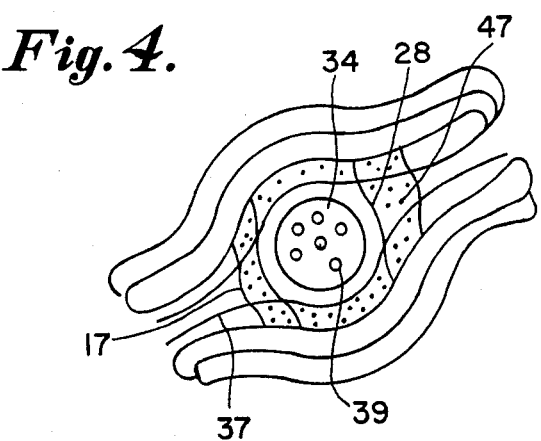
FIG. 4 is an enlarged top view of a perforation through the fibers of the composite of FIG. 1 and a filament rod inserted therein.

Piercing layers 18 and 26 in the above manner does not sever the continuous carbon or graphite yarn materials. Such constituents are typically too hard to be split by needles 29. Rather the flexible carbon or graphite yarns are spread apart as shown in FIG. 4. Continuous yarn 20 of layer 26 and yarn 17 and yarn 37 of fabric segment 16 are spread to form communicating perforations 28. A nonprepregged rod element 34 comprising a dry carbon or graphite yarn including fibers 39 is inserted into each perforation 28.

The perforated fiber preform 41 of FIG. 1C is then impregnated at approximately room temperature in one or more stages with an resin matrix, 47, FIG. 4. The rod elements 34 act as vent pipes to enable conduction of resin through perforations 28 and to the various layers 18 and 26. The impregnated preform is then first cured by heating to about 150 degrees F. and then carbonized such as by heating in an inert atmosphere to up to approximately 1200 degrees F. to thereby reduce the resin matrix to over 90% carbon. The remaining volatiles are driven off by heating the carbonized preform fabric in a graphitization process, e.g. in an induction heated furnace up to approximately 5000 degrees F. During the heating of the carbonization and graphitization processes rod elements 34 enable volatile gasses to be vented out from underlying layers of the composite. Such venting is essential to prevent delamination of the layers in the circumferential and axial planes.

During the heating required for carbonization and graphitization 50–60% of the resin's weight may be lost. Accordingly the composite 41 may be reimpregnated and the heating cycle repeated as many times as required to achieve a desired nominal density, typically in the range of approximately 1.0–2.0 grams/c.c. The rod element-reinforced perforations 28 again enhance uniform and optimum saturation of resin during reimpregnation and venting of volatiles during reheating. When this density has been reached temporary support 10 is removed to leave a carbon-carbon composite 43, FIG. 1D, e.g. carbon yarns embedded in a carbon matrix.

Figure 5:
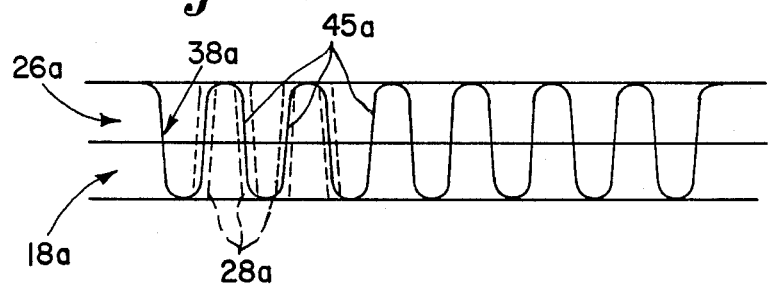
FIG. 5 is a simplified cross-sectional view of an alternative manner of making the perforations.
Figure 6:
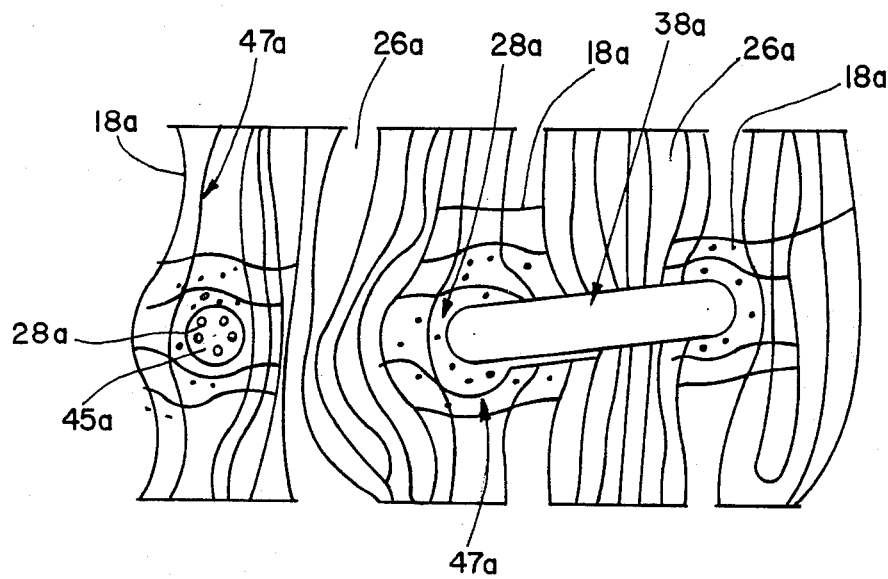
FIG. 6 is an enlarged top view of the "sewn" perforations created by the method of FIG. 5.

An alternative method of making perforations is shown in FIGS. 5 and 6. Layers 18a, 26a, analogous to the aforedescribed layers 18, 26 of this invention are shown cross sectionally. Again any number of alternating layers of fabric segment and wound yarn may be applied over layers 18a, 26a but for clarity only a single layer is shown. A continuous yarn 38a is then sewn through the layers 16a, 18a so that a number of perforations 28a (shown enlarged for clarity) are made; one is made by each stitch 45a passed through the fabric layers. Yarn 38a is allowed to remain in layers 18a, 26a so that individual stitches 45a serve a function similar to rods 34, e.g. they hold perforations 28a open so that successive amounts of resin 47a may be applied evenly to the layers and volatiles may escape during heating.

A method for making an alternative fiber composite according to this invention is illustrated in FIGS. 2A–C. A loom 40 weaves fabric 42 to conform to an irregular shape such as the right cylinder-cone shape of temporary support 44. Support 44 is rotated, by conventional means, about its center line $C_L$ to wind fabric 42 peripherally thereabout. Support 44 is thus substantially covered by fabric 42 which comprises a plurality of warp yarns 50 wound peripherally about support 44 and a plurality of continuous crossing fill yarns 52 oriented orthogonally with yarns 50 and extending the length of support 44. Continuous yarns 50,52 therefore run longitudinally (axially) and peripherally (circumferentially) to enable optimal strength characteristics for fabric 42.

Figure 7:
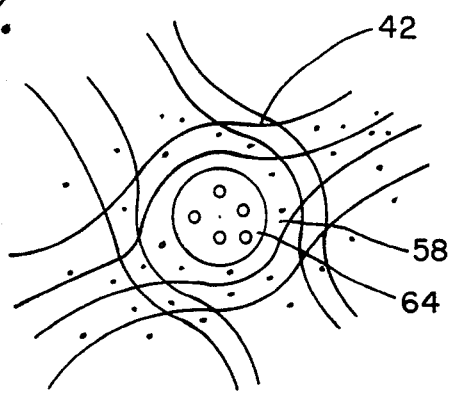
FIG. 7 is an enlarged top view of a perforation through the fibers of the composite of FIG. 2 and a rod element inserted therein.

After the fabric 42 has been wound about support 44 to a desired thickness T1, FIG. 2B, it is pierced in the manner shown in FIG. 3 (except that only one winding of thickness T1 is pierced) and thereby provided with perforations 58. Again, such perforations are made into the covering fabric 42 at a similar angle, e.g., cylinder section 60 is pierced at 45 degrees to center line $C_L$ and cone section 62 is pierced at 0 degree to $C_L$. As shown in FIG. 7 each perforation 58 receives a rod element 64 which fits through perforation 58 in much the same manner that the rod elements 34 fit through perforations 28 in the fabric layers 18, 26 of the embodiment of FIGS. 1 and 4.

The pierced fabric 42 is then processed as previously described through multiple resin impregnation, carbonization and graphitization cycles to achieve a carbon-carbon composite having a nominal density of approximately 1.0–2.0 gm/cc. The rod accommodating perforations 58 again permit enhanced impregnation through the wound fabric 42 and venting of volatile resin constituents during carbonization and graphitization. The support 44 is removed and a composite 70, FIG. 2C, remains.

By providing either of the fiber composite embodiments of this invention, e.g. composites having continuous warp and fill yarns for extending the length of and peripherally about an irregular sloped support, enhanced isotropic strength characteristics are provided to the composites. Flexibility of construction is also exhibited. The fiber patterns may be varied for particular structural needs. For example, a larger ratio of peripheral yarns may be provided for enhancing circumferential strength. Conversely, a larger proportion of longitudinal yarns may be added to improve axial strength. Increasing density of the yarns also enhances strength of the composite fabric. The angle at which longitudinal and peripheral yarns are oriented to each other may be varied up to 45 degrees from precisely orthogonal to vary off-axis structural strength as desired. As heretofore indicated, prepregged involute fabrics are applied stiffly. They thus tend to wrinkle and delaminate. However, because the fiber components of this invention are applied dry, and only then impregnated, they can be made to smoothly conform to the desired irregular shape without wrinkling.

Figure 1D:
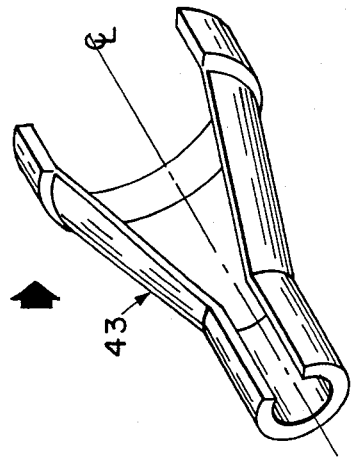

Because isotropic strength is enabled, the fiber is applied in a dry, wrinkle-free manner, and venting of volatiles is allowed during heating, undesirable delamination of composites 43, FIG. 1D and 70, FIG. 2C is reduced.

It is evident that those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. An improved fiber reinforced composite, said fiber reinforcement comprising:
    a first layer comprising a plurality of elongate flexible fabric segments arranged together in an abutting side-by-side relationship defining an elongate irregularly shaped body shell form and having a plurality of continuous longitudinal yarns extending axially the length of each fabric segment, and
    a second layer comprising a continuous yarn wound peripherally upon said first layer and oriented substantially orthogonally with said longitudinal yarns of said first layer.

2. The fiber composite in accordance with claim 1 further comprising one or more additional alternating layers of fabric segments and continuous yarn, each additional fabric segment layer being laid up on a wound continuous yarns layer for substantially covering said yarn layer and having a plurality of continuous longitudinal yarns extending axially the length of each fabric segment and each additional yarn layer being wound peripherally upon said additional fabric layer and oriented substantially orthogonally with said longitudinal yarns of said fabric layer.

3. The fiber composite in accordance with claim 1 wherein said fabric segment and wound yarn layers have a number of cooperating perforations disposed therethrough.

4. The fiber composite in accordance with claim 3 further comprising a number of rod elements, each disposed in a corresponding perforation.

5. The fiber composite in accordance with claim 1 wherein said fabric segment and wound yarn layers are impregnated with a resin matrix.

6. The fiber composite in accordance with claim 5 wherein said resin matrix is carbonized.

7. The fiber composite in accordance with claim 5 wherein said resin matrix is graphitized.

* * * * *